United States Patent [19]

Brakebill et al.

[11] 4,177,924
[45] Dec. 11, 1979

[54] CONDITION RESPONSIVE VALVE CONSTRUCTION AND METHOD OF MAKING THE SAME

[75] Inventors: Harold G. Brakebill, Concord; Edwin M. Dexter, Knoxville, both of Tenn.

[73] Assignee: Robertshaw Controls Company, Richmond, Va.

[21] Appl. No.: 854,423

[22] Filed: Nov. 23, 1977

[51] Int. Cl.² ............................................. G05D 23/02
[52] U.S. Cl. ................................... 236/86; 137/116.5; 137/627.5; 236/100
[58] Field of Search ............... 236/99 R, 99 K, 86, 236/100; 137/627.5, 596.17, 116.5; 123/117 A

[56] References Cited

U.S. PATENT DOCUMENTS

| | | | |
|---|---|---|---|
| 2,830,767 | 4/1958 | Herbenar | 236/99 K |
| 3,006,552 | 10/1961 | Ferris | 236/99 K X |
| 3,009,678 | 11/1961 | Soderberg et al. | 236/99 R X |
| 3,135,495 | 6/1964 | Ferris | 236/86 X |
| 3,303,854 | 2/1967 | Churchill | 137/625.65 |
| 3,848,622 | 11/1974 | Cummings | 236/86 X |
| 3,853,269 | 12/1974 | Graber | 236/99 K X |
| 3,955,760 | 5/1976 | Ridenour et al. | 236/86 |

*Primary Examiner*—William F. O'Dea
*Assistant Examiner*—William E. Tapolcai, Jr.
*Attorney, Agent, or Firm*—Candor, Candor & Tassone

[57] ABSTRACT

A condition responsive valve construction for varying the output pressure of the valve construction in relation to a movable part of a condition responsive device that is moved in relation to the condition sensed thereby, the valve construction having a housing provided with an inlet to be interconnected to a fluid pressure source and an outlet separated from the inlet by a main valve unit and being adapted to be interconnected to vent by a vent valve unit. A biasing spring operatively interconnects the movable part of the condition responsive device to a movable vent valve seat of the vent valve unit to urge the same to an open condition relative to a movable vent valve member by a force that is changeable by the condition sensed by the condition responsive device. A sealing and biasing bellows construction is operatively interconnected to the vent valve seat to tend to urge the same to a closed condition thereof.

20 Claims, 6 Drawing Figures

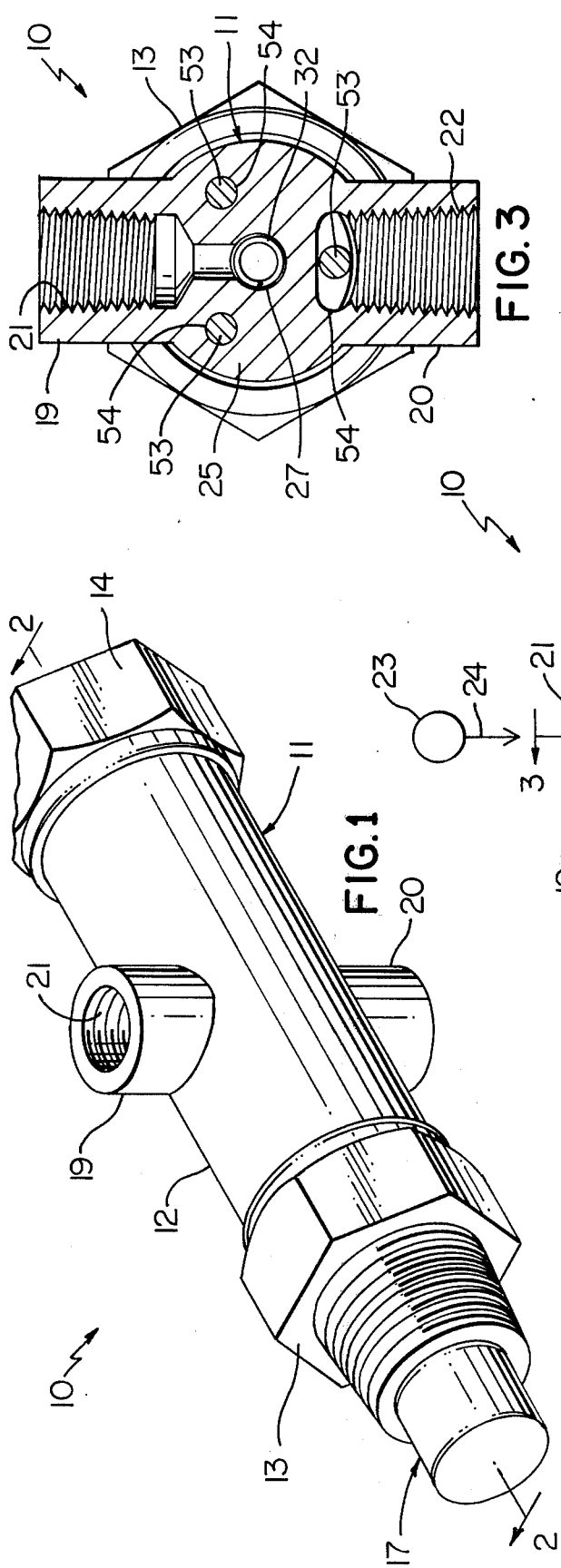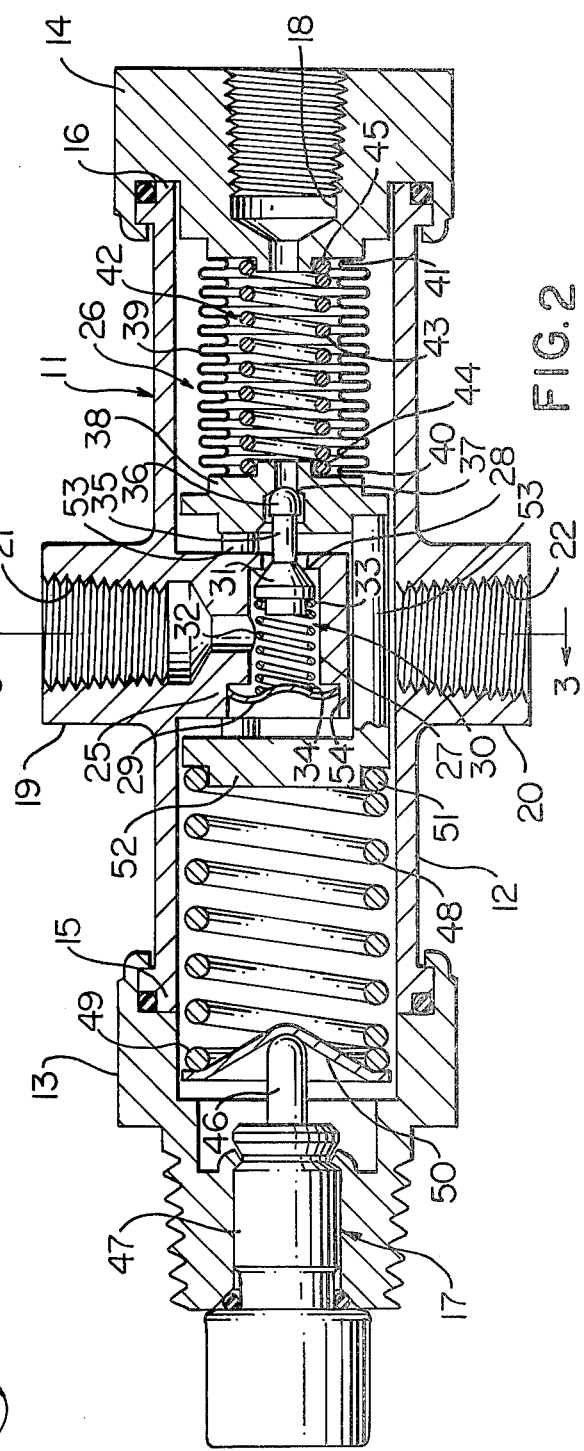

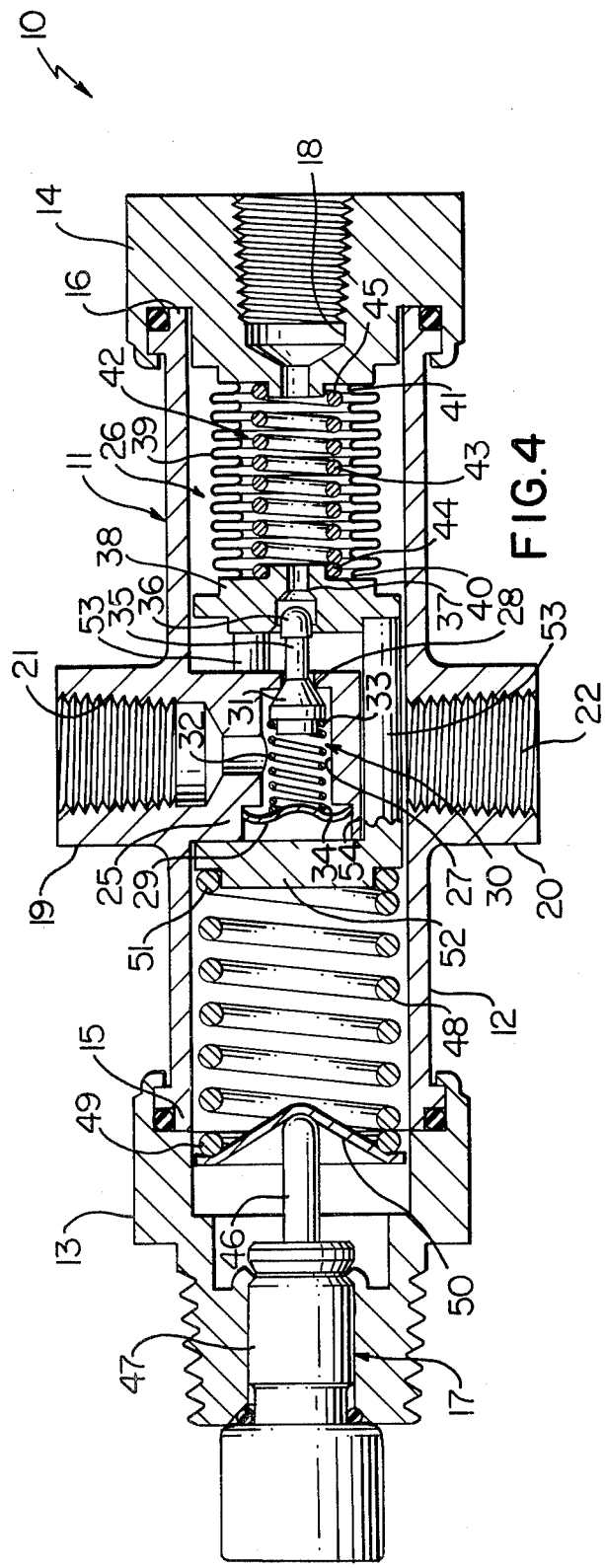
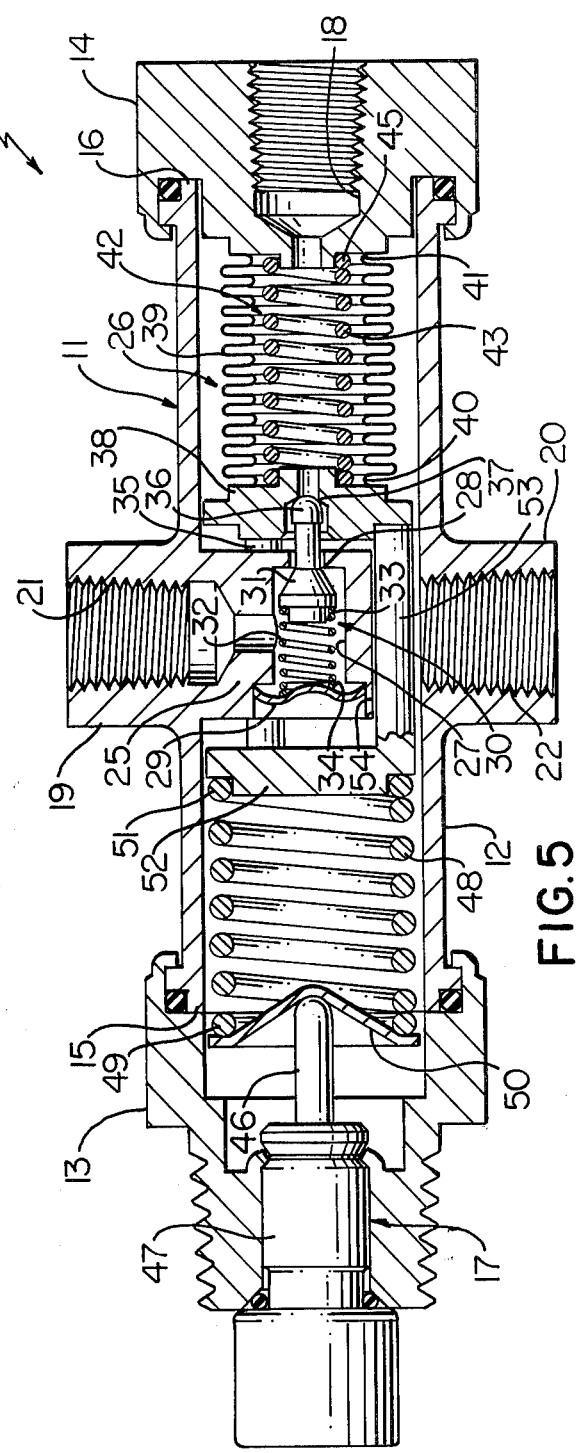
FIG. 4
FIG. 5

CONDITION RESPONSIVE VALVE CONSTRUCTION AND METHOD OF MAKING THE SAME

BACKGROUND OF THE INVENTION

1. Field of the Invention

This invention relates to an improved condition responsive valve construction and to a method of making the same.

2. Prior Art Statement

It is well known to provide a condition responsive valve construction for varying the output pressure of the valve construction in relation to a movable part of a condition responsive means that is moved in relation to the condition sensed thereby, the valve construction having a housing means provided with an inlet to be interconnected to a fluid pressure source and an outlet separated from the inlet by a main valve unit and being adapted to be interconnected to vent by a vent valve unit, the valve units being controlled by the condition responsive means.

For example see the following three items:

(1) U.S. Pat. No. 3,305,172 to Duchek, et al.

(2) Thermal Air Valve No. B 54X25 manufactured by the Rockford Clutch Division of the Borg-Warner Corp. and illustrated and described in the U.S. Pat. No. 3,848,622 to Cummings, III.

(3) U.S. Patent to Ferris, No. 3,066,552.

The condition responsive valve construction of item (1) above appears to have the vent valve unit thereof varied by means of a fluid presssure change acting directly between a movable part of the vent valve unit and the movable part of the condition responsive means whereas the condition responsive valve construction of item (2) above appears to have the vent valve unit thereof varied by means of a rigid valve stem acting directly between and against a movable part of the vent valve unit and the movable part of the condition responsive means. The condition responsive valve construction of item (3) above appears to have a movable vent valve member of the vent valve means thereof varied relative to a fixed vent valve seat by means of a compression spring acting between the vent valve member and a movable part of the condition responsive means thereof.

SUMMARY OF THE INVENTION

It is a feature of this invention to provide a condition responsive valve construction with improved means for varying the position of the movable vent value seat of the vent valve means in relation to the movement of the movable part of the condition responsive means.

In particular, it was found according to the teachings of this invention that a biasing means can operatively interconnect the movable part of a condition responsive means to the vent valve seat to tend to urge the same to an open condition thereof by a force that is changeable by the condition sensed by the condition responsive means.

For example, one embodiment of this invention provides a condition responsive valve construction for varying the output pressure of the valve construction in relation to a movable part of a condition responsive means of the valve construction that is moved in relation to the condition sensed thereby, the valve construction having a housing means provided with an inlet to be interconnected to a fluid pressure source and an outlet separated from the inlet by a main valve means and being adapted to be interconnected to vent by vent valve means, the valve means being controlled by the condition responsive means. A biasing means operatively interconnects the movable part of the condition responsive means to a movable vent valve seat of the vent valve means to tend to urge the same to an open condition thereof relative to a movable vent valve member by a force that is changeable by the condition sensed by the condition responsive means.

It is another feature of this invention to provide such a condition responsive valve construction with improved sealing of certain of the movable parts thereof.

For example, it was found according to the teachings of this invention that it would be desireable to eliminate all sliding O-ring type seals that are subject to wear and which might introduce a certain amount of restriction or stick-slip action and thereby result in a jerky movement of pistons and an irregular curve of the resulting output pressure in relation to the change in temperature sensed thereby.

Accordingly, one embodiment of the condition responsive valve construction of this invention includes in the structure of this invention previously set forth a sealing and biasing bellows construction operatively interconnected to the vent valve seat to tend to urge the same to a closed condition thereof whereby sliding O-ring type seals are eliminated from the valve construction of this invention.

Accordingly, it is an object of this invention to provide an improved condition responsive valve construction having one or more of the novel features of this invention as set forth above or hereinafter shown or described.

Another object of this invention is to provide a method of making such a condition responsive valve construction, the method of this invention having one or more of the novel features of this invention as set forth above or hereinafter shown or described.

Other objects, uses and advantages of this invention are apparent from a reading of this description which proceeds with reference to accompanying drawings forming a part thereof and wherein:

FIG. 1 is a perspective view of the improved valve construction of this invention.

FIG. 2 is an enlarged cross-sectional view taken on line 2—2 of FIG. 1 and illustrates the valve construction in one operating condition thereof.

FIG. 3 is a cross-sectional view taken on line 3—3 of FIG. 2.

FIG. 4 is a view similar to FIG. 2 and illustrates the valve construction in another operating condition thereof.

FIG. 5 is a view similar to FIG. 2 and illustrates the valve construction in still another operating condition thereof.

Figure 6:
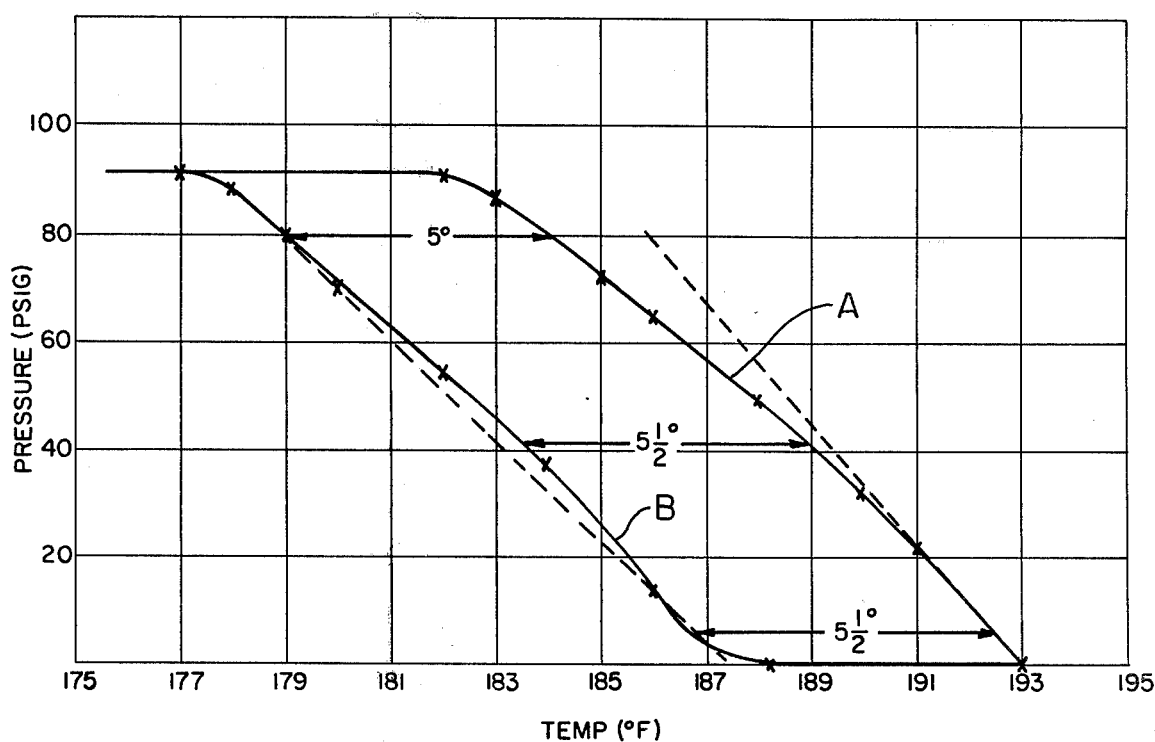
FIG. 6 is a graph illustrating one typical example of the operating temperature range of the condition responsive valve construction of this invention.

While the various features of this invention are hereinafter described and illustrated as being particularly adapted to provide a thermostatic air valve for controlling a spring loaded clutch that drives a truck radiator fan, it is to be understood that the various features of this invention can be utilized singly or in any combination thereof to provide a condition responsive valve construction for other purposes as desired.

Therefore, this inventon is not to be limited to only the embodiment illustrated in the drawings, because the drawings are merely utilized to illustrate one of the wide variety of uses of this invention.

Referring now to FIGS. 1, 2 and 3, the improved condition responsive valve construction of this invention is generally indicated by the reference numeral 10 and comprises a housing means 11 formed from a substantially cylindrical tubular member 12 and a pair of end fittings 13 and 14 suitably secured at the opposed ends 15 and 16 of the tubular housing member 12, the housing fitting 13 carrying a temperature responsive device that is generally indicated by the reference numeral 17 while the other housing fitting 14 has a vent opening 18 passing therethrough for a purpose hereinafter described.

The tubular housing member 12 has a pair of integrally formed and outwardly directed projections 19 and 20 which respectively have openings 21 and 22 passing therethrough, the opening 21 forming an inlet for the housing means 11 and being adapted to be interconnected to a fluid pressure source 23 by a suitable conduit means 24 in a manner well known in the art. The opening 22 of the projection 20 forms an outlet for the valve construction 10 and can be interconnected by a suitable conduit to any desired pressure controlled device as will be apparent hereinafter.

The tubular housing member 12 also has an integrally formed and inwardly directed section 25 thereof that spans the internal chamber 26 of the tubular housing member 12, the section 25 having a stepped opening 27 passing therethrough in a manner coaxial relative to the longitudinal axis of the tubular member 12 as illustrated.

The stepped opening 27 defines a valve seat 28 that leads to the chamber 26 at the right end of the opening 27 in FIG. 2 while the left end of the opening 27 is closed by a suitable spring closure member 29 so that a chamber 30 is formed in the housing section 25 and is disposed in fluid communication with the inlet 21.

A movable valve member 31 is disposed in the chamber 30 of the housing section 25 and is normally urged into a position to close the valve seat 28 by a compression spring 32 also disposed in the chamber 30 and having one end 33 bearing against the valve member 31 and the other end 34 thereof bearing against closure member 29 whereby the compression spring 32 continuously urges the valve member 31 in a direction to close the valve seat 28.

The valve member 31 has a valve stem 35 projecting therefrom and extending out through the valve seat 28, the valve stem 35 terminating with a substantially hemispherical end 36 so as to be adapted to open and close a valve seat 37 of a movable vent valve seat means or member 38 that is disposed in the chamber 26 of the tubular housing member 12 for a purpose hereinafter described.

The movable vent valve seat member 38 is carried by a tubular bellows member 39 that has one end 40 secured to the vent valve seat 38 to be closed thereby and has the other end 41 thereof secured to the housing fitting 14 to likewise be closed thereby whereby the interior chamber 42 of the tubular bellows 39 is sealed from the chamber 26 of the housing means 11 while being disposed in fluid communication not only with the vent valve seat 37 of the vent valve seat member 38, but, also being disposed in fluid communication with the vent port 18 for a purpose hereinafter described.

A compression spring 43 is disposed within the chamber 42 of the bellows member 39 and has one end 44 bearing against the vent valve seat member 38 and the other end 45 thereof bearing against the housing fitting 14 so that the force of the compression spring 43 continuously urges the vent valve seat member 38 to the left in FIG. 2 to tend to engage the valve seat 37 thereof against the end 36 of the valve stem 35 to be closed thereby for a purpose hereinafter described.

The temperature responsive device 17 has a piston 46 movable relative to a cylinder 47 that is fastened to the housing fitting 13, such piston and cylinder device 17 being conventional in the art and being of the type that contains a wax charge or the like within the cylinder member 47 so that when the wax charge reaches a certain temperature, the same begins to expand and further extend the piston 46 out of the cylinder 47 to the right in FIG. 2 until another higher certain temperature is reached so that further expansion of the wax charge ceases. Conversely, as the temperature being sensed by the device 17 decreases, the wax charge begins to contract until the lower temperature of the temperature range is reached whereby the piston 46 can be progressively retracted into the cylinder 47 under a spring force that will be apparent hereinafter and for a purpose hereinafter described.

A compression spring 48 is disposed in the chamber 26 of the housing means 11 and operatively interconnects the movable part 46 of the condition responsive device 17 to the movable valve seat member 38 because one end 49 of the spring 48 bears against a spring retainer 50 that is disposed against the piston 46 of the device 17 while the other end 51 of the spring 48 engages against a movable cage member 52 that is disposed in the chamber 26 and has a plurality of abutment rods 53 extending therefrom and respectively passing through openings 54 formed through the central section 25 of the tubular housing member 12 to abut against the movable valve seat member 38 as illustrated.

In this manner, the force of the compression spring 48 continuously tends to urge the valve seat member 38 to the right in FIG. 2 in opposition to the force of the compression spring 43 within the bellows member 39 for a purpose hereinafter described.

The lower opening 54 formed transversely through the central section 25 of the tubular housing member 12 is substantially larger than the rod 53 being received therein so that the lower opening 54 always fluidly communicates the chamber 26 of the housing means 11 with the outlet thereof for a purpose hereinafter described, the upper two openings 54 in the housing section 25 while loosely receiving their respective rods 53, actually guide their movement axially relative to the tubular housing member 12 for a purpose hereinafter described.

From the above, it can be seen that the valve construction 10 of this invention can be formed by the method of this invention in a relatively simple manner to cause the compression spring 48 to operatively interconnect the movable part 46 of the condition responsive device 17 to the movable valve seat member 38 and cause the biasing and sealing bellows construction 39 to be operatively interconnected to valve seat member 38 to permit the condition responsive valve construction 10 of this invention to operate in a manner now to be described without having sliding O-ring type seals.

Assuming that the temperature being sensed by the device 17 is below the predetermined temperature that begins to cause the wax charge thereof to expand, the force of the compression spring 48 maintains the piston 46 of the device 17 in its fully retracted position as illustrated in FIG. 2 whereby the force of the compression spring 43 is greater than the combined force of the compression spring 48 and the force of the compression spring 32 acting on the valve member 31 as well as the pressure force in the chamber 26 acting to move the vent valve seat member 38 to the right so that the valve member 31 is held in an open position away from the valve seat 28 through the action of the vent valve seat member 38 engaging its valve seat 37 against the end 36 of the valve stem 35 as illustrated in FIG. 2.

In this manner, as long as the temperature being sensed by the device 17 is below the lowest temperature of the temperature range of the device 17, the valve member 31 is held in an open position relative to the valve seat 28 so that a full flow of fluid from the source 23 is adapted to pass through the opened valve seat 28 and pass out through the outlet 22 whereby the pressure value of the fluid at the outlet 22 is substantially the same as the pressure value of the fluid entering the inlet 21, the vent opening 18 being fully closed by the vent valve seat member 38 having its seat 37 fully closed by its engagement against the end 36 of the valve stem 35 of the valve member 31 as illustrated in FIG. 2.

However, as the temperature being sensed by the device 17 increases to the predetermined lower temperature of the operating temperature range of the device 17, the wax charge therein begins to expand and thereby force the piston 46 further out of the cylinder 47 to the right in FIG. 2 to thereby cause the compression spring 48 to be more compressed between the spring retainer 50 and the cage 52 so that the force of the compression spring 48 tending to move the vent valve seat member 38 to the right in FIG. 2 increases.

Eventually, the increasing force of the compression spring 48 overcomes the opposing force of the compression spring 43 to thereby move the vent valve member 38 to the right as illustrated in FIG. 4 to permit the valve member 31 to fully seat against the valve seat 28 and terminate the flow of the pressure fluid from the source 21 to the outlet 22.

Should the piston 46 be further extended outwardly from the cylinder 47 as illustrated in FIG. 4 due to a further increase in temperature sensed by the device 17, the force of the compression spring 48 further moves the vent valve seat member 38 to the right to move its valve seat 37 away from the end 36 of the valve stem 35 and thereby interconnect the chamber 26 to the vent 18 and thereby exhaust some of the fluid pressure in the chamber 26 and, thus, from the outlet 22 to thereby reduce the pressure value of the pressure fluid being delivered to the valve construction 10 to the pressure controlled device interconnected to the outlet 22. Since the fluid pressure in the chamber 26 is now being reduced, the force thereof also acting on the vent valve member 38 to move the same to the right decreases so that the force of the compression spring 43 can now overcome the force of the compression spring 48 to move the vent valve member 38 back to the left and thereby close the vent valve seat 37 through its engagement with the end 36 of the valve stem 35. In this manner, the valve construction 10 is in balance and maintains a certain pressure at the outlet 22 for the particular temperature being sensed by the device 17.

Should an unbalance in the system occur by a decrease in the force being produced by the spring 48 or by a leakage causing a reduction in the pressure in the chamber 26 being sensed by the vent valve seat member 38, the spring 43 will move the valve member 31 to the left as illustrated in FIG. 5 to open the supply valve seat 28 to supply more fluid pressure from the source 23 into the chamber 26 and, thus, to the outlet 22 to thereby increase the same until the force of the pressure fluid in the chamber 26 again moves the vent valve member 38 to the right to permit the valve member 31 to close the valve seat 28 whereby the valve construction 10 will be back into balance.

Thus, it can be seen that as the temperature sensed by the device 17 increases from the first lowest predetermined temperature thereof up to the highest temperature of the temperature range thereof, the force of the compression spring 48 is progressively increased and thereby causes a proportional decrease in the pressure value of the pressure fluid being delivered to the outlet 22 of the valve construction 10 for the reasons previously set forth. Conversely, as the temperature being sensed by the device 17 progressively decreases from the high temperature of the temperature range thereof toward the low temperature of the temperature range thereof, the valve construction 10 will progressively increase the pressure value of the pressure fluid at the outlet 22 for the reasons previously set forth.

As previously set forth, the valve construction 10 of this invention can be utilized to control a spring loaded clutch which drives a truck radiator fan in such a manner that the clutch is normally engaged and is disengaged when supply air is applied thereto. In order to prevent sudden loads from being applied to the fan belt, it is desirable to send a modulated signal to the clutch to permit slippage and gradual loading of the belt as the radiator water temperature goes up.

Accordingly, in one typical application of such a use of the valve construction 10 of this invention, the temperature responsive device 17 has been selected so that the operating temperature range thereof is approximately 182° F. to approximately 193° F. as illustrated by the line A in the graph of FIG. 6.

Accordingly, it can be seen in FIG. 6 that as long as the temperature of the water in the truck radiator is below 182° F., the pressure value of the air that is directed to the clutch from the valve construction 10 is substantially the same as the pressure value of the air supplied to the valve construction 10 which in the example of FIG. 6 is approximately 90 psig whereby such pressure value maintains the clutch in disengagement. However, increases in water temperature above 182° F. gradually reduces the pressure value of the output air from the valve construction 10 until it reaches 0 at approximately 193° F. to permit the clutch to fully engage. Due to hysteresis caused by friction in the temperature responsive device 17 and the various valve parts of the valve construction 10, the output pressure value at the outlet 22 does not begin to rise until the water has cooled to approximately 187° F. as represented by the line B in the graph of FIG. 6. Further cooling increases the output pressure value at the outlet 22 until it reaches the supply pressure of approximately 90 psig at approximately 177° F. as fully represented by the line B of the graph of FIG. 6 whereby the clutch will be fully disengaged.

Therefore, it can be seen that this invention not only provides an improved condition responsive valve construction, but also this invention provides a method of making such a condition responsive valve construction or the like.

While the form and method of this invention now preferred have been illustrated and described as required by the Patent Statute, it is to be understood that other forms and method steps can be utilized and still fall within the scope of the appended claims.

What is claimed is:

1. In a condition responsive valve construction for varying the output pressure of said valve construction in relation to a movable part of a condition responsive means of said valve construction that is moved in relation to the condition sensed thereby, said valve construction having a housing means provided with an inlet to be interconnected to a fluid pressure source and an outlet separated from said inlet by main valve means and being adapted to be interconnected to vent by vent valve means, said valve means being controlled by said condition responsive means, said vent valve means comprising a movable vent valve member and a movable vent valve seat adapted to be opened and closed by said vent valve member, the improvement comprising biasing means operatively interconnecting said movable part of said condition responsive means to said vent valve seat of said vent valve means to urge the same to an open condition relative to said vent valve member by a force that is changeable by the condition sensed by said condition responsive means.

2. A condition responsive valve construction as set forth in claim 1 and including a sealing and biasing bellows means operatively interconnected to said vent valve seat of said vent valve means to tend to urge the same to a closed condition thereof relative to said vent valve member.

3. A condition responsive valve construction as set forth in claim 1 wherein said biasing means comprises a coiled compression spring.

4. A condition responsive valve construction as set forth in claim 3 wherein said coiled compression spring has opposed ends, one of said ends of said spring being operatively interconnected to said movable part of said condition responsive means and the other end of said spring being operatively interconnected to said vent valve seat of said vent valve means.

5. A condition responsive valve construction as set forth in claim 4 wherein another coiled compression spring is carried by said housing means and provides the means that urges said vent valve seat of said vent valve means towards the closed condition thereof.

6. A condition responsive valve construction as set forth in claim 5 wherein said coiled compression springs are coaxially aligned in said housing means.

7. A condition responsive valve construction as set forth in claim 6 wherein said coiled compression springs are spaced from each other and are disposed on opposite sides of said vent valve means.

8. A condition responsive valve construction as set forth in claim 7 wherein said coiled compression springs are also disposed on opposite sides of said main valve means.

9. A condition responsive valve construction as set forth in claim 8 wherein a cage member partially surrounds said main valve means and has one end engaging said vent valve seat of said vent valve means and another end engaging said other end of the first-mentioned coiled compression spring to operatively interconnect the same to said vent valve seat of said vent valve means.

10. A condition responsive valve construction as set forth in claim 1 wherein said condition responsive means comprises a piston and cylinder device carried by said housing means.

11. In a method of making a condition responsive valve construction for varying the output pressure of said valve construction in relation to a movable part of a condition responsive means of said valve construction that is moved in relation to the condition sensed thereby, said valve construction having a housing means provided with an inlet to be interconnected to a fluid pressure source and an oulet separated from said inlet by main valve means and being adapted to be interconnected to vent by vent valve means, said valve means being controlled by said condition responsive means, said vent valve means comprising a movable vent valve member and a movable vent valve seat adapted to be opened and closed by said vent valve member, the improvement comprising the steps of operatively interconnecting said movable part of said condition responsive means to said vent valve seat of said vent valve means by biasing means to urge said vent valve seat to an open condition relative to said vent valve member by a force that is changeable by the condition sensed by said condition responsive means.

12. A method of making a condition responsive valve construction as set forth in claim 11 and including the step of operatively interconnecting a sealing and biasing bellows means to said vent valve seat of said vent valve means to tend to urge the same to a closed condition thereof relative to said vent valve member.

13. A method of making a condition responsive valve construction as set forth in claim 11 and including the step of forming said biasing means from a coiled compression spring.

14. A method of making a condition responsive valve construction as set forth in claim 13 and including the step of operatively interconnecting one end of said spring to said movable part of said condition responsive means and the other end of said spring to said vent valve seat of said vent valve means.

15. A method of making a condition responsive valve construction as set forth in claim 14 and including the step of disposing another coiled compression spring in said housing means to provide the means that urges said vent valve seat of said vent valve means towards the closed condition thereof.

16. A method of making a condition responsive valve construction as set forth in claim 15 and including the step of disposing said coiled compression springs so as to be coaxially aligned in said housing means.

17. A method of making a condition responsive valve construction as set forth in claim 16 and including the step of spacing said coiled compression springs from each other so as to be disposed on opposite sides of said vent valve means.

18. A method of making a condition responsive valve construction as set forth in claim 17 and including the step of disposing said coiled compression springs so as to be also on opposite sides of said main valve means.

19. A method of making a condition responsive valve construction as set forth in claim 18 and including the step of partially surrounding said main valve means with a cage member that has one end engaging said vent valve seat of said vent valve means and another end engaging said other end of the first-mentioned coiled compression spring to operatively interconnect the same to said vent valve seat of said vent valve means.

20. A method of making a condition responsive valve construction as set forth in claim 11 and including the step of forming said condition responsive means from a piston and cylinder device that is to be carried by said housing means.

* * * * *